(12) United States Patent
DeJong (10) Patent No.: US 8,531,773 B2
(45) Date of Patent: Sep. 10, 2013

(54) SUBSTRATE GUIDED RELAY HAVING A HOMOGENIZING LAYER

(75) Inventor: Christian Dean DeJong, Sammamish, WA (US)

(73) Assignee: Microvision, Inc., Redmond, WA (US)

( * ) Notice: Subject to any disclaimer, the term of this patent is extended or adjusted under 35 U.S.C. 154(b) by 256 days.

(21) Appl. No.: 12/987,666

(22) Filed: Jan. 10, 2011

(65) Prior Publication Data

US 2012/0176682 A1    Jul. 12, 2012

(51) Int. Cl.
*G02B 27/14* (2006.01)

(52) U.S. Cl.
USPC ........................................... 359/630

(58) Field of Classification Search
USPC ................ 359/630, 237, 242, 267, 290–292, 359/295, 298
See application file for complete search history.

(56) References Cited

U.S. PATENT DOCUMENTS

| | | | |
|---|---|---|---|
| 3,915,548 A | 10/1975 | Opittek et al. |
| 4,387,297 A | 6/1983 | Swartz |
| 4,997,261 A | 3/1991 | Taniura |
| 5,224,198 A | 6/1993 | Jachimowicz et al. |
| 5,266,788 A | 11/1993 | Yamazaki |
| 5,369,415 A | 11/1994 | Richard et al. |
| 5,465,311 A | 11/1995 | Caulfield et al. |
| 6,023,372 A | 2/2000 | Spitzer et al. |
| 6,084,724 A | 7/2000 | Wiegand et al. |
| 6,129,439 A | 10/2000 | Hou et al. |
| 6,140,979 A | 10/2000 | Gerhard et al. |
| 6,166,834 A | 12/2000 | Taketomi et al. |
| 6,245,590 B1 | 6/2001 | Wine et al. |
| 6,285,489 B1 | 9/2001 | Helsel |
| 6,331,909 B1 | 12/2001 | Dunfield |
| 6,362,912 B1 | 3/2002 | Lewis |
| 6,384,406 B1 | 5/2002 | Wine |
| 6,390,370 B1 | 5/2002 | Plesko |

(Continued)

FOREIGN PATENT DOCUMENTS

| | | |
|---|---|---|
| EP | 0559406 | 9/1993 |
| FR | 2681702 | 3/1993 |

(Continued)

OTHER PUBLICATIONS

Amitai, Yaakov , "P-27: A Two-Dimensional Aperture Expander for Ultra-Compact, High-Performance Head-Worn Displays", *SID International Symposium*, Boston, MA May 24-27, 2005, vol. 36 , 360-363.

*Primary Examiner* — Scott J Sugarman
*Assistant Examiner* — Brandi Thomas
(74) *Attorney, Agent, or Firm* — Kevin D. Wills (57) ABSTRACT

Briefly, in accordance with one more embodiments, a substrate guided relay for a photonics module includes a slab guide having a first end and a second end, and a first surface and a second surface. An input coupler disposed at the first end of the slab guide at an interface between the input coupler and the slab guide receives an input beam and feeds the input beam into the slab guide which generates multiple copies of the input beam. An output coupler disposed on the first surface of the slab guide causes the multiple copies of the input beam to exit the slab guide via the output coupler as an output. A homogenizer disposed on the second surface of the slab guide reflects at least some of the multiple copies of the input beam to increase uniformity of the output.

5 Claims, 6 Drawing Sheets

(56) References Cited

U.S. PATENT DOCUMENTS

| | | |
|---|---|---|
| 6,404,550 B1 | 6/2002 | Yajima |
| 6,433,907 B1 | 8/2002 | Lippert |
| 6,512,622 B2 | 1/2003 | Wine |
| 6,515,278 B2 | 2/2003 | Wine |
| 6,515,781 B2 | 2/2003 | Lewis |
| 6,525,310 B2 | 2/2003 | Dunfield |
| 6,577,411 B1 | 6/2003 | David |
| 6,710,902 B2 | 3/2004 | Takeyama |
| 6,791,760 B2 | 9/2004 | Janeczko et al. |
| 6,821,457 B1 | 11/2004 | Natarajan et al. |
| 6,829,095 B2 | 12/2004 | Amitai |
| 6,833,955 B2 | 12/2004 | Niv |
| 7,018,044 B2 | 3/2006 | Chen et al. |
| 7,021,777 B2 | 4/2006 | Amitai |
| 7,046,892 B2 | 5/2006 | Yoshikawa et al. |
| 7,145,611 B2 | 12/2006 | Dubin et al. |
| 7,158,306 B1 | 1/2007 | Cobb |
| 7,418,170 B2 | 8/2008 | Mukawa et al. |
| 7,570,859 B1 | 8/2009 | DeJong |
| 7,589,901 B2 | 9/2009 | DeJong et al. |
| 7,613,373 B1 | 11/2009 | DeJong |
| 7,784,954 B1 * | 8/2010 | Coleman .................. 362/19 |
| 7,839,575 B2 * | 11/2010 | DeJong et al. ............ 359/633 |
| 2001/0031107 A1 | 10/2001 | Bradshaw |
| 2002/0126086 A1 | 9/2002 | Takeuchi et al. |
| 2002/0141026 A1 | 10/2002 | Wiklof |
| 2005/0180687 A1 | 8/2005 | Amitai |
| 2005/0253055 A1 | 11/2005 | Sprague |
| 2006/0132914 A1 | 6/2006 | Weiss et al. |
| 2006/0228073 A1 | 10/2006 | Mukawa et al. |
| 2006/0274296 A1 | 12/2006 | Tolbert et al. |
| 2006/0291021 A1 | 12/2006 | Mukawa |
| 2007/0008624 A1 | 1/2007 | Hirayama |
| 2007/0091445 A1 | 4/2007 | Amitai |
| 2007/0159673 A1 | 7/2007 | Freeman et al. |
| 2007/0171328 A1 | 7/2007 | Freeman et al. |
| 2008/0025667 A1 | 1/2008 | Amitai |
| 2009/0015929 A1 | 1/2009 | DeJong et al. |
| 2010/0111472 A1 | 5/2010 | DeJong |

FOREIGN PATENT DOCUMENTS

| | | |
|---|---|---|
| FR | 2866442 | 8/2005 |
| WO | WO-03/081320 | 10/2003 |
| WO | WO-2005/104566 | 11/2005 |
| WO | WO-2006/085308 | 8/2006 |
| WO | WO-2007/054928 | 5/2007 |
| WO | WO-2007/062098 | 5/2007 |
| WO | WO-2008/023367 | 2/2008 |

* cited by examiner

SUBSTRATE GUIDED RELAY HAVING A HOMOGENIZING LAYER

BACKGROUND

A substrate guided relay may be utilized in a head-up display (HUD) system or the like to generate one or more copies of an input light and to homogenize the input light at the pupil of the user's eye. Such a substrate guided relay generally may comprise an input coupler, a slab guide, and an output coupler. For a uniformly illuminated pupil, it may be beneficial to have additional copies of the input light and to provide additional homogenization of the output light. If an additional element such as a homogenizer is added to the substrate guided relay to increase the uniformity of the light output, very tight tolerances may be involved in aligning the additional element with the other elements of the substrate guided relay, and reflections from the surfaces of the additional element need to be accounted for, making fabrication of a such a device more difficult.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
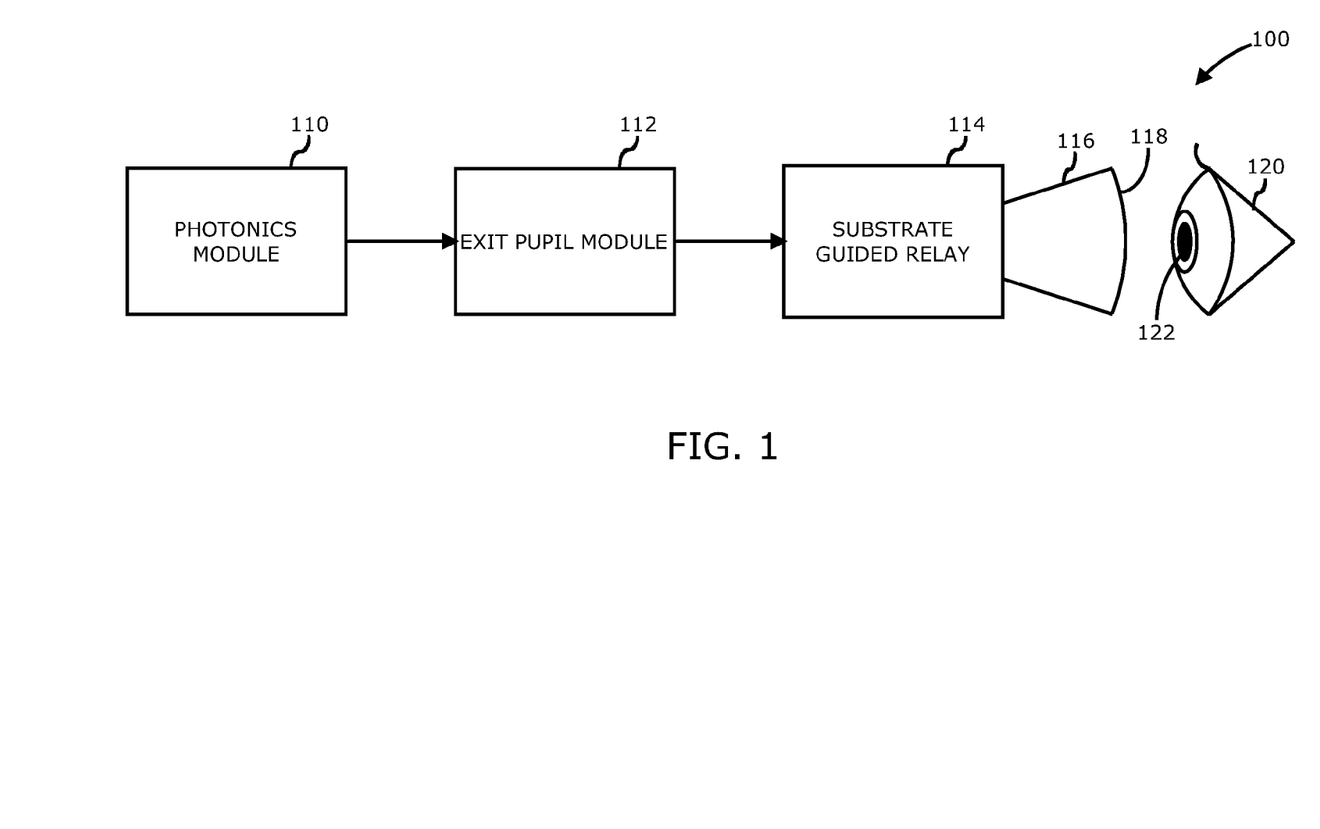
FIG. 1 is a block diagram of a display system that includes a substrate guided relay having a homogenizing layer in accordance with one or more embodiments.
Figure 5:
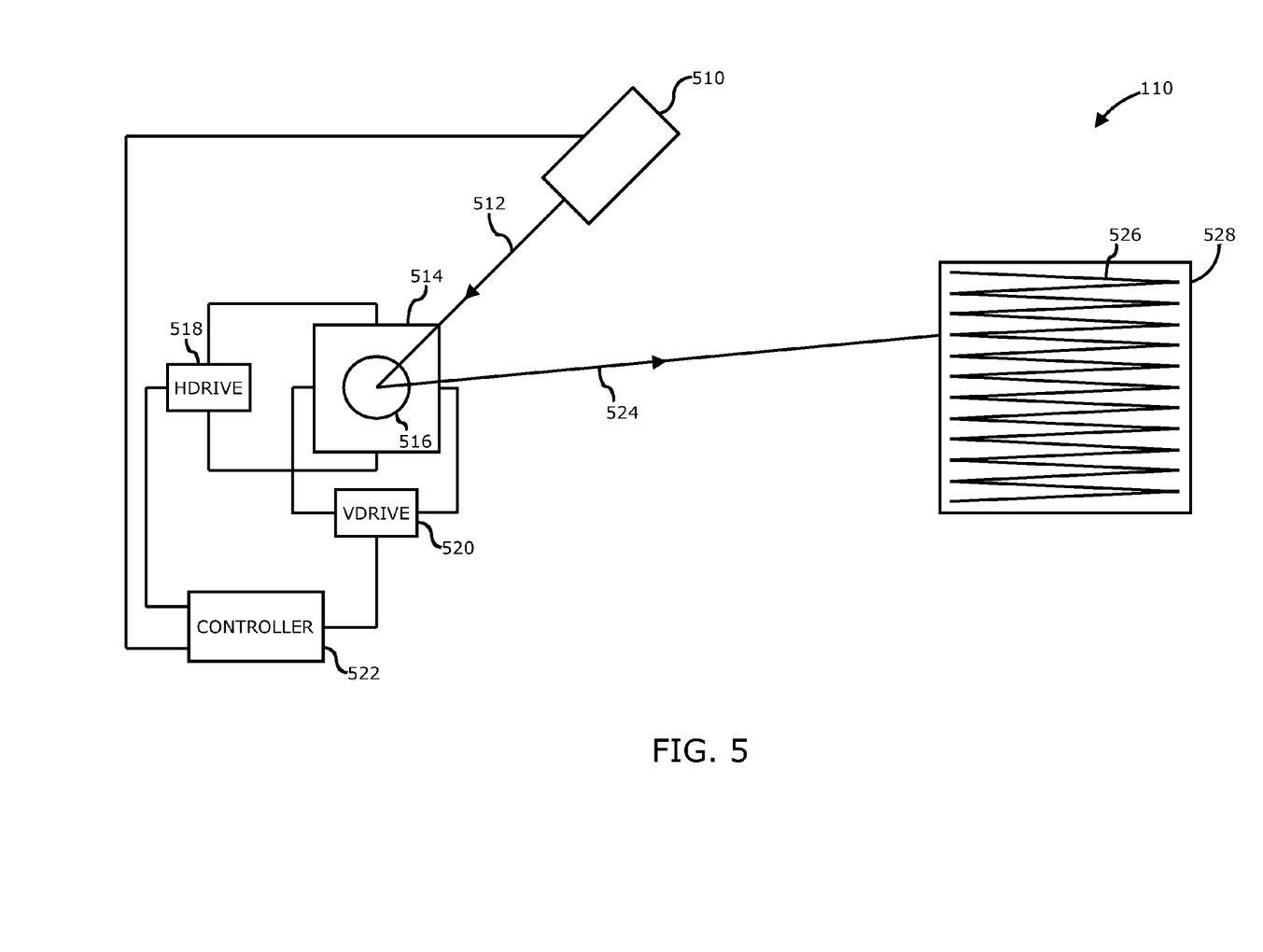
FIG. 5 is a diagram of a scanned beam display as one example of a photonics module of FIG. 1 that may be utilized with a substrate guided relay having a homogenizing layer in accordance with one or more embodiments.

Referring now to FIG. 1, a block diagram of a display system that includes a substrate guided relay having a homogenizing layer in accordance with one or more embodiments will be discussed. As shown in FIG. 1, display system 100 may comprise a head-up display (HUD) or the like that may be deployed in a head mount arrangement or in a vehicle display system as one of several examples. Such a display system 100 may comprise a photonics module 110 or a projector that is capable of creating and projecting an image. An example of such a photonics module 110 is shown in and described with respect to FIG. 5, below. The output of photonics module 110 may be provided to an exit pupil module 112 that may be configured to expand the exit pupil of the output of photonics module 110, or alternatively may be configured to reduce the exit pupil of the output of photonics module 110 depending on the type of display technology of photonics module 110. For example, photonics module 110 may comprise a scanned beam display such as shown in FIG. 5 that scans a beam such as a laser beam in a raster pattern to generate a displayed image. Such a photonics module 110 may have a relatively small exit pupil that is smaller than the exit pupil size desired to accommodate for eye motion, the field of view of the system, and/or display system motion, in which case the exit pupil module 112 may be configured to expand the exit pupil. In such embodiments, exit pupil module 112 may comprise a microlens array (MLA) that operates to provide numerical aperture expansion of the beam in order to result in a desired expansion of the exit pupil. By expanding the exit pupil in such a manner, vignetting in the displayed image may be reduced or eliminated. Alternatively, photonics module 110 may comprise a digital light projector (DLP) or a liquid-crystal on silicon (LCOS) projector that generates a relatively larger sized exit pupil. In such embodiments, exit pupil module 112 may be configured to reduce the exit pupil of the image generated by photonics module 110 to create a larger field of view or more efficient pupil. However, these are merely examples of how the exit pupil module 112 may alter the exit pupil of the image generated by photonics module 110, and the scope of the claimed subject matter is not limited in these respects.

In one or more embodiments, the image generated by photonics module 110 may be processed by a substrate guided relay (SGR) 114 which may operate to create one or more copies of the input light from photonics module 110 to create an output 116 that is more homogenized when image reaches the user's eye 120. An example of such a substrate guided relay 114 and the operation thereof is shown in and described in U.S. Pat. No. 7,589,091 which is hereby incorporated herein by reference thereto in its entirety. In accordance with one or more embodiments, a substrate guided relay 114 having a homogenizing layer is shown in and described with respect to FIG. 2, below.

Figure 2:
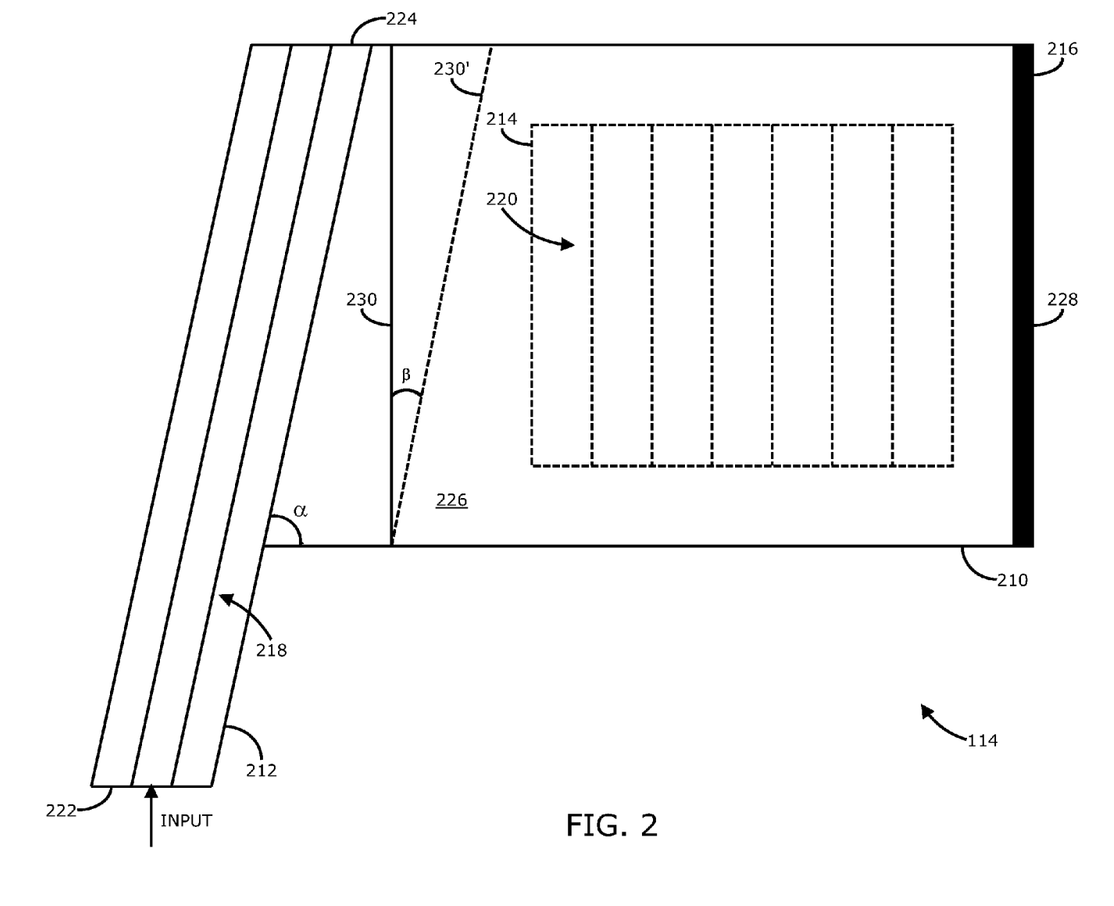
FIG. 2 is a top plan view of a substrate guided relay having a homogenizing layer and capable of being utilized with the display system of FIG. 1 in accordance with one or more embodiments.

Referring now to FIG. 2, a top plan view of a substrate guided relay having a homogenizing layer and capable of being utilized with the display system of FIG. 1 in accordance with one or more embodiments will be discussed. As shown in FIG. 2, substrate guided relay 114 may comprise a slab guide 210 having an input coupler 212 and an output coupler 214. The input coupler 212 is disposed adjacent to an edge or on a surface of the slab guide 210 to receive the image beam as an input at a first end 222 of the input coupler 212 wherein the input beam traverses through the input coupler 212 to the second end 224 of the input coupler 212. The input beam traverses through the input coupler 212 to create multiple copies of the input beam and to feed the multiple copies of the input beam into the slab guide 210. The input coupler 212 generally may be disposed at an angle, a, with respect to a long edge of the slab guide 210 so that the input coupler 212 is disposed at an angle complementary to angle, a, with respect to the angle of incidence of the input. Input coupler 212 may comprise two or more parallel internal surfaces 218, for example two to five internal surfaces 218, to facilitate the multiple internal reflections and therefore multiple copies of the input beam and to facilitate redirection of those rays from input coupler 212 into slab guide 210. The parallel internal surfaces 218 are also parallel to the external surfaces of the input coupler 212 in one or more embodiments. As multiple copies of the input beam exit the input coupler 212 and enter into slab guide 210, these light rays may be generally directed toward one end 228 of the slab guide 210. As the light rays travel internally through slab guide 210, the rays are reflected multiple times off the internal and external surfaces of the slab guide 210 and multiple copies of the rays are generated. As will be discussed in further detail, below, some of the rays are feed into a homogenizer 226 disposed on one surface of the slab guide 210. Homogenizer 226 is bounded by end 228 and end 230. The homogenizer 226 serves to create additional copies of the light rays and to make the light rays more uniform as they are directed to output coupler 214 and ultimately exit the slab guide 210 via exit coupler 214. As shown in FIG. 2, exit coupler 214 is disposed on a surface of slab guide 210 opposite to the surface on which homogenizer 226 is disposed. Since FIG. 2 illustrates substrate guided relay 114 in a top plan view, homogenizer 226 is disposed on a top surface of slab guide 210 and output coupler 214 is disposed on a bottom surface of slab guide 210. Furthermore, in one or more embodiments, end 230 of homogenizer 226 optionally may be disposed at an angle, β, as shown as end 230', to be parallel, or nearly parallel, with the input coupler 212, although the scope of the claimed subject matter is not limited in this respect.

The output coupler 214 may include multiple parallel internal surfaces 220 to help capture and redirect light rays from the slab guide 210 to exit via the output coupler 214 as output 116 in a manner substantially similar to the operation of parallel internal surfaces 218 of input coupler 212 except that the parallel internal surfaces 220 direct the light rays to exit output coupler 214. The output coupler 214 could also be a diffractive or holographic surface, etching, or film that redirects the light that is incident upon it. The light rays that happen to reach the end 228 of output coupler 214 and/or the end of homogenizer 226 are absorbed by an absorbing edge 216 that is disposed at end 228 of the slab guide 210 and homogenizer. As a result, the light rays that impinge on the absorbing edge 216 are absorbed, or sufficiently attenuated, such that those absorbed light rays do not ever reach output coupler 214 and do not exit slab guide 210. Without the presence of absorbing edge 216, some light rays that would otherwise be absorbed by the absorbing edge 216 would possibly eventually reach output coupler 214 and create an unintended ghost image or other image artifact. By utilization of absorbing edges 216, the rays that would cause such image artifacts are absorbed by the absorbing edge 216 in order to sufficiently reduce or eliminate those rays from the output image.

In one or more embodiments, the homogenizing layer 226 is bounded by the outside edges of the slab guide 210 on three common sides which comprise all of the perimeter edges of homogenizer 226 except end 230. Since these perimeter surfaces are at the perimeter of the slab guide 210, light that strikes them is absorbed as is light similarly propagating in the slab guide 210. The remaining surface end 230 of homogenizer is generally parallel to the interface of the input coupler 212 and slab guide with some clearance from that interface on the side of the slab guide 210. Because this end 230 is downstream from the input coupler interface 232, no light will encounter the end 230 as it propagates toward the output coupler 214. As a result, end 230 is not constrained by the same tolerances associated with the other surfaces that interact with the light rays in a meaningful manner throughout the substrate guided relay 114. Further details of such operation of the homogenizer are shown in and described with respect to FIG. 3 and FIG. 4, below.

Figure 3:
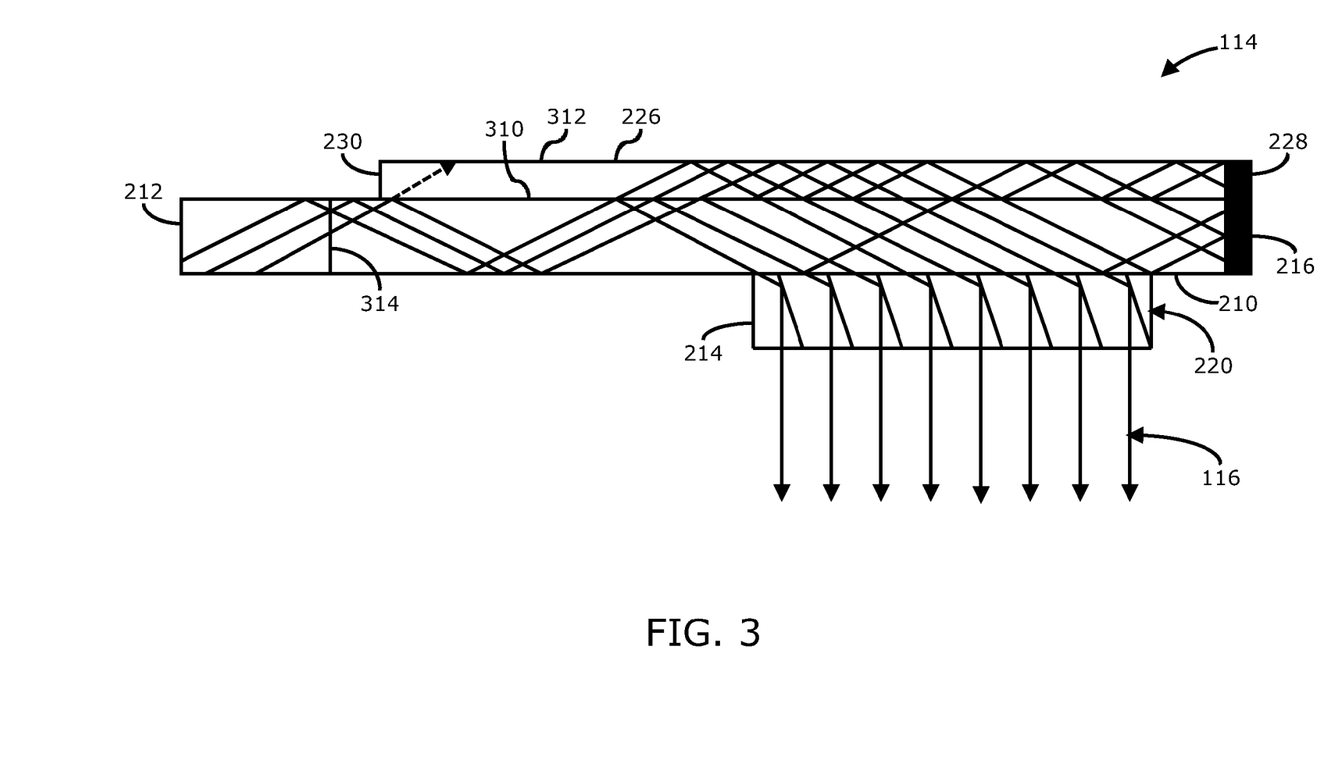
FIG. 3 is an elevation view of the substrate guided relay of FIG. 2 having a homogenizing layer in accordance with one or more embodiments.

Referring now to FIG. 3, an elevation view of the substrate guided relay of FIG. 2 having a homogenizing layer in accordance with one or more embodiments will be discussed. As shown in FIG. 3, the input beam enters the substrate guided relay 114 via input coupler 212 which generates multiple copies of the input beam and directs the beams into the slab guide 210 as multiple light rays. The light rays reflect of the internal surfaces of the slab guide 210 and are eventually redirected to exit the slab guide 210 via exit coupler 214 as output 116. Some of the light rays are reflected off the internal surfaces of the slab guide 210, and some of the light rays exit the slab guide 210 and enter into homogenizer 226 via interface 310. The light rays in homogenizer 226 reflect off of surface 312 to be redirected back into slab guide 210 via interface 310 to eventually exit slab guide 210 via output coupler 214. Light rays reflect off of the internal parallel surfaces 220 of the output coupler 214 to facilitate the exiting of the light rays through the output coupler 214. Some of the light rays may reach end 228 before exiting via output coupler 214. These light rays that reach end 228 are absorbed by absorbing edge 216 disposed on the end of the slab guide 210 and the homogenizer 226. It should be noted that the light rays shown in FIG. 3 are provided for purposes of example, however not all light rays are shown, nor is the reflecting or refracting of all light rays necessarily shown. In general, the reflectance between any two elements of FIG. 3, for example between the slab guide 210 and the homogenizer 226 may be selected to have a desired reflectance which may vary as a function of position, angle, wavelength, or polarization, or combinations thereof, and the scope of the claimed subject matter is not limited in this respect.

In the embodiment shown in FIG. 3, the end 230 of homogenizer 226 that is not in common with the perimeter edges of the slab guide 210 may be disposed at some distance away from the interface 314 between the input coupler 212 and the slab guide 210 with some clearance. In such an embodiment, the end 230 of homogenizer 226 does not require critical alignment since the light rays in the substrate guided relay do not interact with this end 230 when there is some non-zero clearance between end 230 and interface 314 as shown. Furthermore, since the light rays do not interact with this end 230, there is no need to provide a coating or absorbing edge on end 230, although the scope of the claimed subject matter is not limited in this respect. An alternative embodiment wherein end 230 does at least partially overlap interface 314 is shown in and described with respect to FIG. 4, below.

Figure 4:
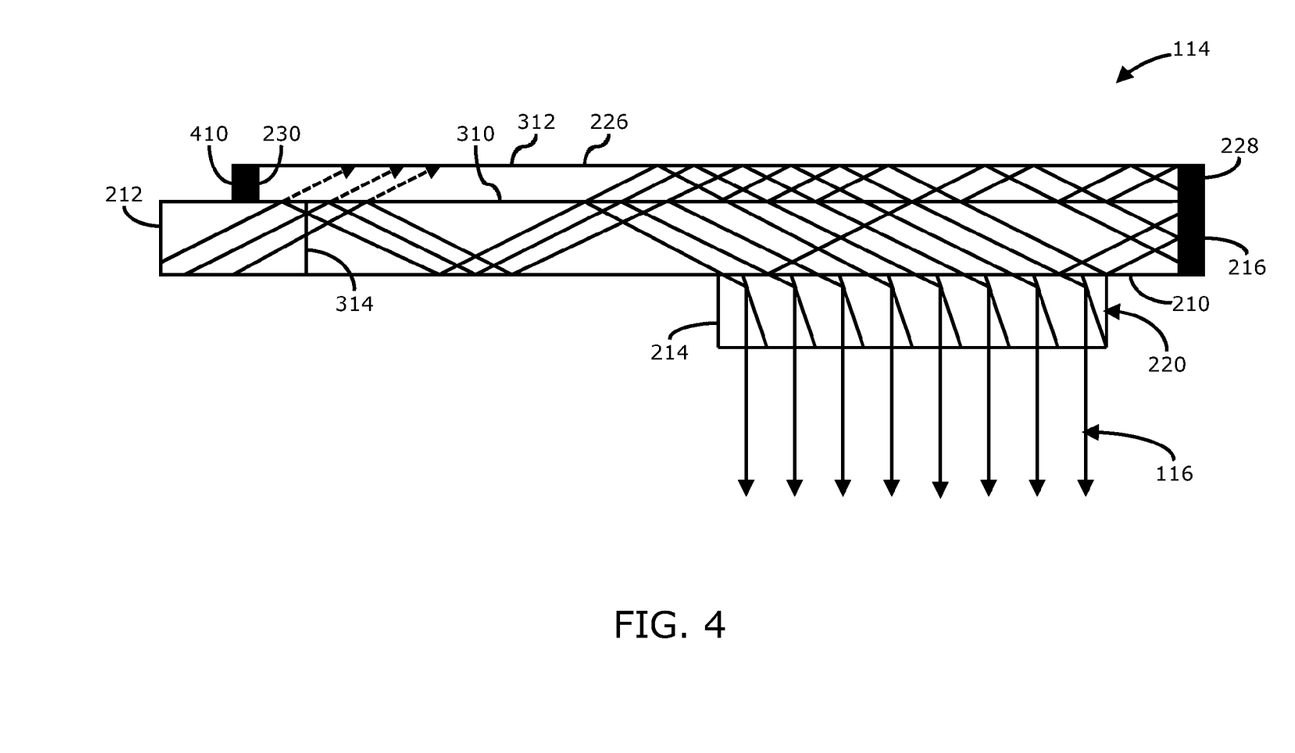
FIG. 4 is an elevation view of the substrate guided relay of FIG. 3 having an additional absorbing edge on the homogenizing layer in accordance with one or more embodiments.

Referring now to FIG. 4, an elevation view of the substrate guided relay of FIG. 3 having an additional absorbing edge on the homogenizing layer in accordance with one or more embodiments will be discussed. The embodiment of substrate guided relay 114 shown in FIG. 4 is substantially similar to substrate guided relay 114 of FIG. 3, except that the end 230 of homogenizer 226 meets or at least partially overlaps and/or extends beyond interface 314 between the input coupler 212 and slab guide 210. In such an embodiment, the light rays in the substrate guided relay 114 may interact with end 230, in which case such interaction should be accounted for. As shown in FIG. 4, an additional absorbing edge 410 may be disposed at the end 230 of homogenizer to account for the interaction of the light rays with end 230. The absorbing edge 410 may absorb, or otherwise sufficiently attenuate, the light rays that impinge on end 230 so that the effect of such light rays may be reduced or eliminated from the output 116, for example to prevent an unintended ghost image in the output 116 from such light rays. Thus, in one or more embodiments, the homogenizer 226 may include an absorbing edge 410 at the end 230 near interface 314, although the scope of the claimed subject matter is not limited in this respect. Furthermore, in one or more embodiments, the distance between end 230 of homogenizer 226 may be variable as light moves from the first end 222 to the second end 224 of the input coupler 212. In such embodiments, the variation in this distance may be used to adjust or control the amount of light that leaves the input coupler 212 and enters into the homogenizer 226, although the scope of the claimed subject matter is not limited in this respect. It should be noted that the light rays shown in FIG. 4 are provided for purposes of example, however not all light rays are shown, nor is the reflecting or refracting of all light rays necessarily shown. In general, the reflectance between any two elements of FIG. 4, for example between the slab guide 210 and the homogenizer 226 may be selected to have a desired reflectance which may vary as a function of position, angle, wavelength, or polarization, or combinations thereof, and the scope of the claimed subject matter is not limited in this respect. An example of a photonics module 110 that may work with substrate guided relay 114 having the homogenizer 226 of FIG. 2, FIG. 3 and FIG. 4 is shown in and described with respect to FIG. 5, below.

Referring now to FIG. 5, a diagram of a scanned beam display as one example of a photonics module of FIG. 1 that may be utilized with a substrate guided relay having a homogenizing layer in accordance with one or more embodiments will be discussed. As shown in FIG. 5, photonics module 110 comprises a light source 510, which may be a laser light source such as a laser or the like, capable of emitting a beam 512 which may comprise a laser beam. In some embodiments, light source 510 may comprise two or more light sources, such as in a color system having red, green, and blue light sources, wherein the beams from the light sources may be combined into a single beam. In one or more embodiments, light source 510 may include a first full color light source such as a red, green, and blue light source, and in addition may include a fourth light source to emit an invisible beam such as an ultraviolet beam or an infrared beam. The beam 512 is incident on a scanning platform 514 which may comprise a microelectromechanical system (MEMS) based scanner or the like in one or more embodiments, and reflects off of scanning mirror 516 to generate a controlled output beam 524. In one or more alternative embodiments, scanning platform 514 may comprise a diffractive optic grating, a moving optic grating, a light valve, a rotating mirror, a spinning silicon device, a digital light projector (DLP) device, a flying spot projector, or a liquid-crystal on silicon (LCOS) device, or other similar scanning or modulating devices. In the case of a scanning device a horizontal drive circuit 518 and/or a vertical drive circuit 520 modulate the direction in which scanning mirror 516 is deflected to cause output beam 524 to generate a raster scan 526, thereby creating a displayed image, for example on a display screen and/or image plane 528. A display controller 522 controls horizontal drive circuit 518 and vertical drive circuit 520 by converting pixel information of the displayed image into laser modulation synchronous to the scanning platform 514 to write the image information as a displayed image based upon the position of the output beam 524 in raster pattern 526 and the corresponding intensity and/or color information at the corresponding pixel in the image. Display controller 522 may also control other various functions of photonics module 110.

In one or more embodiments, a horizontal axis may refer to the horizontal direction of raster scan 526 and the vertical axis may refer to the vertical direction of raster scan 526. Scanning mirror 516 may sweep the output beam 524 horizontally at a relatively higher frequency and also vertically at a relatively lower frequency. The result is a scanned trajectory of laser beam 524 to result in raster scan 526. The fast and slow axes may also be interchanged such that the fast scan is in the vertical direction and the slow scan is in the horizontal direction. The beam 524 may also scan in other patterns such as a circular or elliptical pattern in one or more alternative embodiments. However, the scope of the claimed subject matter is not limited in these respects.

In one or more particular embodiments, the photonics module 110 as shown in and described with respect to FIG. 5 may comprise a pico-projector developed by Microvision Inc., of Redmond, Wash., USA, referred to as PicoP™. In such embodiments, light source 510 of such a pico-projector may comprise one red laser, one green laser, and one blue laser with a lens near the output of the respective lasers that collects the light from the lasers and provides a very low numerical aperture (NA) beam at the output. The light from the lasers may then be combined with dichroic elements into a single white beam 512. Using a beam splitter and/or basic fold-mirror optics, the combined beam 512 may be relayed onto biaxial MEMS scanning mirror 516 disposed on scanning platform 514 that scans the output beam 524 in a raster pattern 526. Modulating the lasers synchronously with the position of the scanned output beam 524 may create the projected image. In one or more embodiments the photonics module 114, may be disposed in a single module known as an Integrated Photonics Module (IPM), which in some embodiments may be 7 millimeters (mm) in height and less than 5 cubic centimeters (cc) in total volume, although the scope of the claimed subject matter is not limited in these respects.

Figure 6:
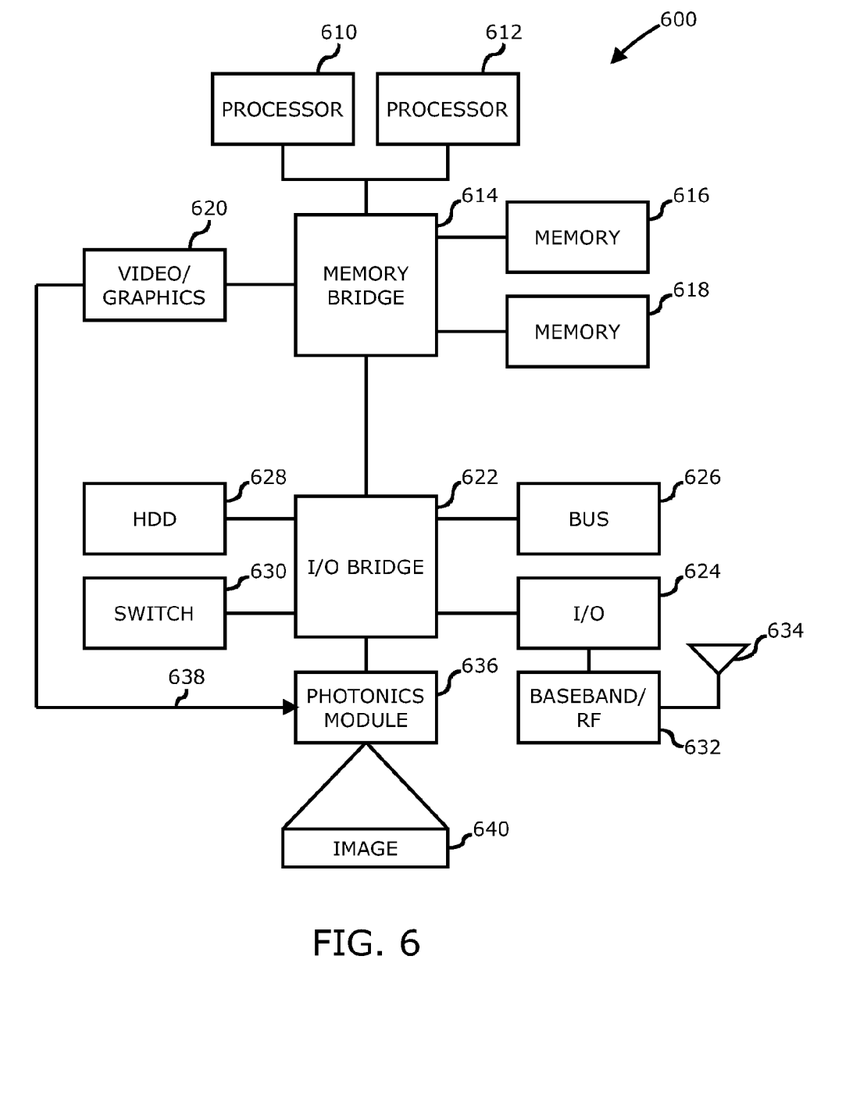
FIG. 6 is a diagram of an information handling system including a photonics module with a substrate guided relay having a homogenizing layer in accordance with one or more embodiments.

Referring now to FIG. 6, a diagram of an information handling system including a photonics module with a substrate guided relay having a homogenizing layer in accordance with one or more embodiments will be discussed. Information handling system 600 of FIG. 6 may tangibly embody display system 100 as shown in and described with respect to FIG. 1. Although information handling system 600 represents one example of several types of computing platforms, including cell phones, personal digital assistants (PDAs), netbooks, notebooks, internet browsing devices, tablets, and so on, information handling system 600 may include more or fewer elements and/or different arrangements of the elements than shown in FIG. 6, and the scope of the claimed subject matter is not limited in these respects.

Information handling system 600 may comprise one or more processors such as processor 610 and/or processor 612, which may comprise one or more processing cores. One or more of processor 610 and/or processor 612 may couple to one or more memories 616 and/or 618 via memory bridge 614, which may be disposed external to processors 610 and/or 612, or alternatively at least partially disposed within one or more of processors 610 and/or 612. Memory 616 and/or memory 618 may comprise various types of semiconductor based memory, for example volatile type memory and/or non-volatile type memory. Memory bridge 614 may couple to a video/graphics system 620 to drive a display device, which may comprise photonics module 636, coupled to information handling system 600. Photonics module 636 may comprise the photonics module 110 of FIG. 1. In one or more embodiments, video/graphics system 620 may couple to one or more of processors 610 and/or 612 and may be disposed on the same core as the processor 610 and/or 612, although the scope of the claimed subject matter is not limited in this respect.

Information handling system 600 may further comprise input/output (I/O) bridge 622 to couple to various types of I/O systems. I/O system 624 may comprise, for example, a universal serial bus (USB) type system, an IEEE 1394 type system, or the like, to couple one or more peripheral devices to information handling system 600. Bus system 626 may comprise one or more bus systems such as a peripheral component interconnect (PCI) express type bus or the like, to connect one or more peripheral devices to information handling system 600. A hard disk drive (HDD) controller system 628 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 630 may be utilized to couple one or more switched devices to I/O bridge 622, for example Gigabit Ethernet type devices or the like. Furthermore, as shown in FIG. 6, information handling system 600 may include a baseband and radio-frequency (RF) block 632 comprising a base band processor and/or RF circuits and devices for wireless communication with other wireless communication devices and/or via wireless networks via antenna 634, although the scope of the claimed subject matter is not limited in these respects.

In one or more embodiments, information handling system 600 may include a photonics module 636 that may correspond to photonics module 110 of FIG. 1 and which optionally may include any one or more or all of the components of the scanned beam display of FIG. 5 such as controller 522, horizontal drive circuit 518, vertical drive circuit 520, and/or laser source 510. Furthermore, photonics module 636 may include or otherwise be coupled with exit pupil module 112 and substrate guided relay 114 of FIG. 1 wherein the substrate guided relay 114 includes a homogenizer 226 as discussed herein. In one or more embodiments, photonics module 636 may be controlled by one or more of processors 610 and/or 612 to implement some or all of the functions of controller 522 of FIG. 5. In one or more embodiments, photonics module 636 may comprise a MEMS based scanned laser display for displaying an image 640 projected by photonics module 636. In one or more embodiments, a display system 100 of FIG. 1 may comprise video/graphics block 620 having a video controller to provide video information 638 to photonics module 636 to display an image 640. In one or more embodiments, information handling system 600 may couple to a display system 100 of FIG. 1, for example where display system 100 comprises a head up display system disposed in an eyewear or headgear apparatus coupled to the information handling system 600 wherein photonics module 636 comprises the photonics module 110 of FIG. 1 in addition to exit pupil module 112 and substrate guided relay 114 having a homogenizer 226 as discussed herein. However, these are merely example implementations of display system 100 with information handling system 600, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to a substrate guided relay having a homogenizing layer and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:
1. A display system, comprising:
 a photonics module to generate an image as an output light; and
 a substrate guided relay to receive the output light from the photonics module as an input light to generate multiple copies of input light from and to homogenize the input light, the substrate guided relay comprising:
  a slab guide having a first end and a second end, and a first surface and a second surface;
  an input coupler disposed at the first end of the slab guide at an interface between the input coupler and the slab guide to receive an input beam and to feed the input beam into the slab guide;
  an output coupler disposed on the first surface of the slab guide to cause the multiple copies of the input beam to exit the slab guide via the output coupler as an output; and
  a homogenizer disposed on the second surface of the slab guide, the homogenizer having a first end and a second end, the second end of the homogenizer being commonly located with the second end of the slab guide, wherein the homogenizer reflects at least some of the input beam to increase uniformity of the output;
  wherein the second end of the homogenizer and the second end of the slab guide include an absorbing edge to absorb at least some of the input beam.

2. A display system as claimed in claim 1, wherein the first end of the homogenizer is disposed at an offset distance away from the interface between the input coupler and the slab guide.

3. A display system as claimed in claim 1, wherein the first end of the homogenizer is disposed at an offset distance away from the interface between the input coupler and the slab guide such that the first end of the homogenizer does not require an absorbing edge.

4. A display system as claimed in claim 1, wherein the first end of the homogenizer is disposed downstream from the interface between the input coupler and the slab guide such that the input beam do not interact with the first end of the homogenizer.

5. A display system as claimed in claim 1, wherein the first end of the homogenizer is disposed at or at least partially overlapping the interface between the input coupler and the slab guide.

* * * * *